Figure 1:
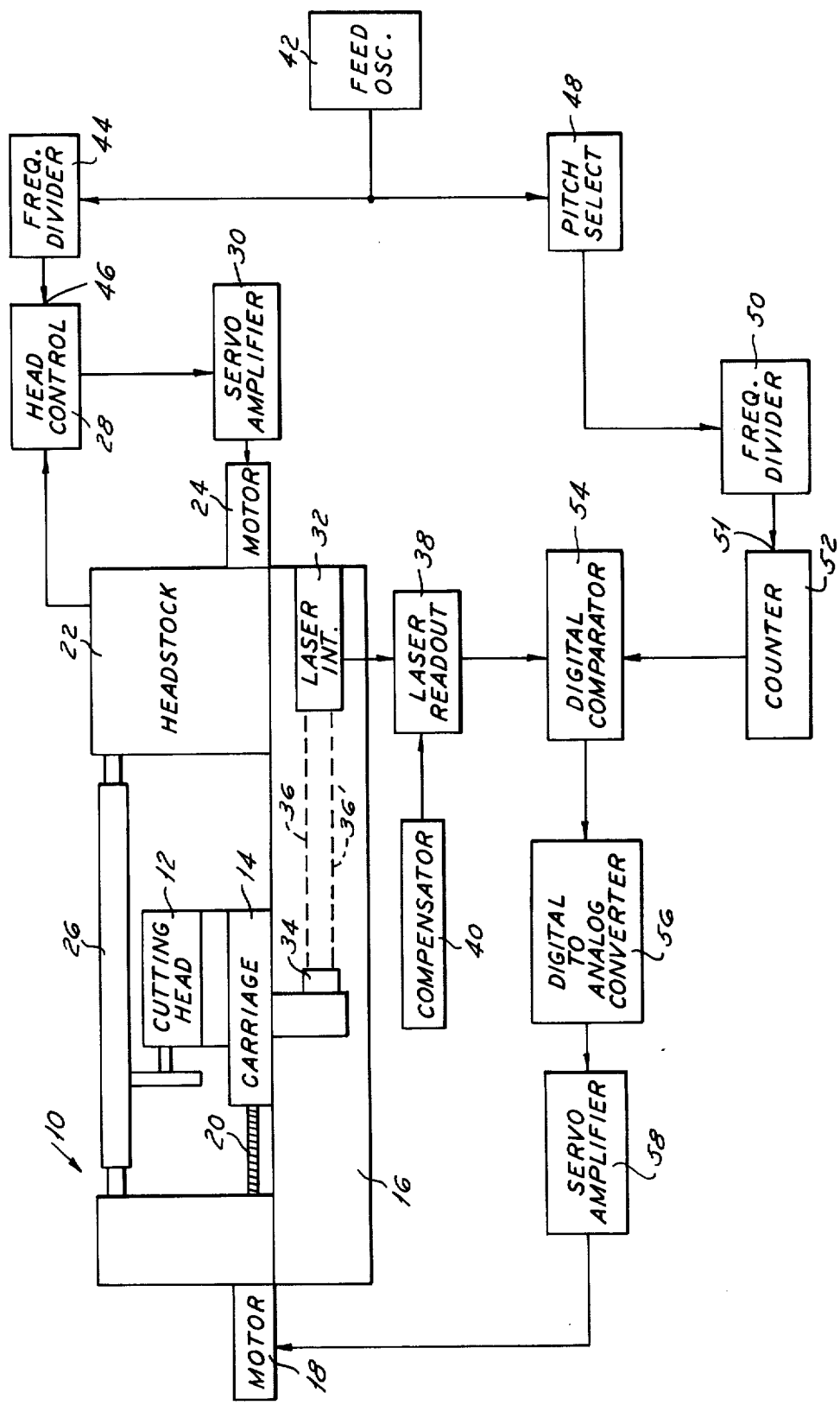

United States Patent [19]

Winget

[11] 4,038,890
[45] Aug. 2, 1977

[54] MACHINE CONTROL SYSTEM

[75] Inventor: James L. Winget, Ferndale, Mich.

[73] Assignee: U.S. Industries, Inc., Ferndale, Mich.

[21] Appl. No.: 634,855

[22] Filed: Nov. 24, 1975

[51] Int. Cl.² .......................... B23B 3/00; B23B 5/46
[52] U.S. Cl. ........................................ 82/5; 82/2 B;
235/151.11; 318/567
[58] Field of Search ................ 82/2 B, 5; 235/151.11;
318/567, 571

[56] References Cited
U.S. PATENT DOCUMENTS

| 3,174,367 | 3/1965 | Lukens | 82/5 |
| 3,381,557 | 5/1968 | Dunn | 82/2 B |
| 3,595,106 | 7/1971 | Pomella et al. | 82/5 X |
| 3,817,129 | 6/1974 | Nishimura et al. | 82/5 |

Primary Examiner—Leonidas Vlachos
Attorney, Agent, or Firm—Barnes, Kisselle, Raisch & Choate

[57] ABSTRACT

An electronic circuit particularly suited for use in a precision lead screw generator to monitor and control linear displacement of the carriage and cutting head and angular displacement or rotation of the workpiece at a preselected, fixed ratio. Rotation of the workpiece is controlled by a phase-locked electronic servo loop which divides one revolution of the piece into a preselected number of discrete increments. Similarly, linear displacement of the cutting head is controlled by an electronic servo loop, including a laser interferometer, which divides a selected unit of displacement into discrete increments. A master oscillator and appropriate frequency dividers incrementally step the respective servo loops at a frequency ratio corresponding to the desired pitch or lead of the final product.

9 Claims, 3 Drawing Figures

MACHINE CONTROL SYSTEM

The present invention relates to motion control devices and, more particularly, to an electronic circuit for monitoring and controlling the rate of displacement of two independently driven elements of a machine at a preselected, fixed ratio. Specifically, the present invention relates to a circuit for monitoring and controlling the pitch or lead, i.e., rotary and linear displacement, of a precision lead screw generator.

Systems for controlling rotary and linear motion of lead screw generators according to the prior art usually comprise a precision master lead screw and/or precision gears operatively connecting the feed carriage to the headstock, and by means of which the linear motion of the thread cutter on a feed carriage, and the rotary motion of the workpiece are closely controlled at a preselected, fixed ratio to produce a lead screw of preselected pitch (threads per inch) or lead (inches per thread). Such control systems have several significant disadvantages, not the least of which is the difficulty in manufacturing the master lead screw and/or precision gears to the necessary close tolerances. Further difficulties arise where it is desired to change the lead or pitch of the screws being manufactured. In such circumstances the master lead screw and/or one or more of the precision gears must be changed and the entire lead screw generator must be recalibrated before production may be restarted.

Circumstances occasionally arise wherein a lead screw is machined at one temperature, usually close to room temperature and used at a significantly different temperature. For example, it may be known and specified in advance that a particular lead screw of a desired operating pitch or lead will be used in an extremely cold environment, such as in a space capsule or a cold storage area, or in an extremely hot environment, such as in a furnace. Under such circumstances, shrinkage or expansion of the screw material between room and operating temperatures must be taken into consideration at the time the lead screw is machined for the pitch or lead thereof to be precisely that desired under operating conditions. In prior art control systems of the type described above, each such special situation required that a special master lead screw and/or special gears be manufactured, installed and calibrated.

It is an object of the present invention to provide an electronic control circuit which will precisely control the rate of displacement of two independently driven machine elements at a preselected, fixed ratio to each other, and which may be readily pre-programmed or re-programmed to a selected motion relationship or ratio.

More specifically, it is an object of the present invention to provide a machine control circuit which will precisely coordinate and control the linear motion of the cutting head with the rotary motion of the workpiece at a preselected pitch or lead as required for generation and inspection of precision lead screws, and which may be readily and easily pre-programmed or re-programmed to the selected pitch or lead.

In furtherance of the object stated immediately above, it is yet another object of the present invention to provide a control circuit for lead screw generators which may be readily programmed for a specified shrinkage or expansion of the workpiece between manufacture and use.

The novel features which are considered to be characteristic of the present invention are set forth in particular in the appended claims.

Figure 2:
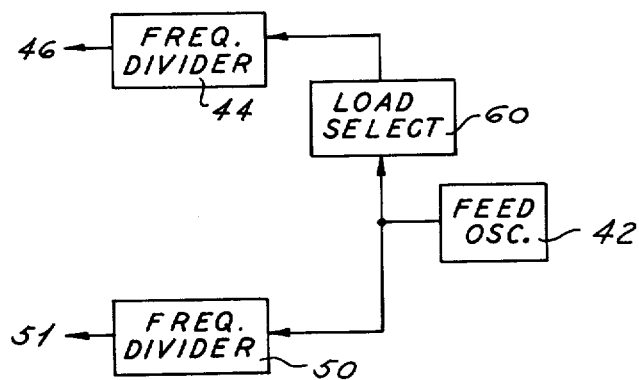
Figure 3:
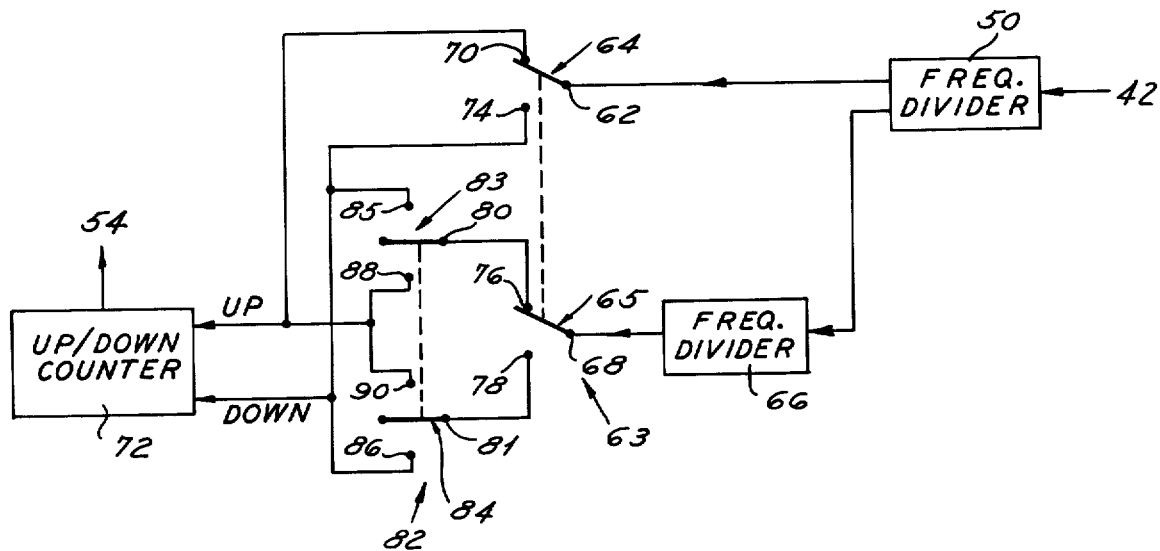

The invention itself, however, together with additional objects, features and advantages thereof, will be best understood from the following description when read in conjunction with the accompanying drawings in which:

FIG. 1 is a block diagram of a presently preferred basic embodiment of the control circuit provided by the present invention disclosed in combination with a lead screw generator;

FIG. 2 is a modification to the embodiment of FIG. 1 for more readily generating a lead screw in selected units of inches per thread, as opposed to threads per inch; and FIG. 3 is a block diagram of another modification to the basic embodiment of FIG. 1 which may be used to compensate for expansion or contraction of the final product between manufacture and use, and/or to selectively generate left-handed or right-handed lead screws.

Referring to FIG. 1, the control circuit provided by the present invention is disclosed in combination with a conventional lead screw generator 10 of the type including a cutting head 12 carried by a carriage 14 which, in turn, is mounted on suitable low-friction ways (not shown) on a base 16 and is adapted to be translated linearly therealong by a motor 18 and a lead screw 20. A headstock 22 is provided in generator 10 and includes a motor 24 and suitable zero-backlash gears (not shown) for rotating a workpiece 26. Lead screw generator 10 may be any one of the usual types of machine tools well known and readily available, the generator 10 schematically depicted in FIG. 1 not, in and of itself, forming a part of the present invention. In the operation of lead screw generator 10, cutting head 12 and carriage 14 are translated as a unit and workpiece 26 is rotated at a preselected displacement or, more specifically, rate of displacement ratio to generate a lead screw on workpiece 26 having a preselected pitch (threads per inch) or lead (inches per thread).

Headstock 22 is connected in a phase-locked incremental electronic servo loop which includes a head control circuit 28 receiving an input from headstock 22 and providing an output through a servo amplifier 30 to motor 24. Headstock 22 preferably includes a conventional transducer or resolver of the type which provides a phase-modulated signal to head control circuit 28 as a function of the rotation of workpiece 26. Such a resolver usually includes a movable member operatively connected to rotate with the workpiece and a second member fixed in position relative to the first member. Both members have one or more electrical coils connected thereto and are mounted with respect to each other so as to produce a electromagnetic coupling between the coil sets. The electrical signal induced into the coils of one member by an alternating current reference signal applied to the coils of the other member is phase-modulated as a function of the relative angular positions of the members. Resolvers of this type are disclosed, for example, in the U.S. Pat. Nos. of R. S. Childs 2,650,352 and 2,671,892, and Tripp et al 2,799,853.

In head control circuit 28 the phase-modulated resolver signal is compared in a phase detector to the output of a high speed digital counter to provide a phase-error signal which controls the frequency of a counter-driving oscillator. The phase-locked loop thus formed is an electronic servo in which the phase-modulated resolver signal is the input, the output of the counter is the output, and the phase detector is the "difference device" which maintains the counter output in accurate phase relationship with the resolver signal. The counter thus goes through its preselected numerical range in synchronism with the phase-modulated signal, such that the states of the counter shift in time-phase in correspondence with any phase-shift in the resolver signal. The digital state of the loop counter is compared to a preselected digital number in a second counter at a time fixed in time-phase with the reference resolver input signal, the error signal resulting from this comparison correspondingly driving servo amplifier 30 and motor 24. Thus, if the high speed counter has a base number of ten thousand, i.e., counts from one to ten thousand during each cycle of the resolver output, and if the resolver is a 720 pole unit having an output which executes one cycle or 360° phase-shift for each degree of resolver armature rotation, head control circuit 28 effectively divides a full revolution or 360° of armature rotation into 3.6 million (360 times 10,000) discrete intervals. Thus, in the example cited, each time the second counter is incremented by one unit, the head control circuit 28 steps or rotates workpiece 26 one ten-thousandth (0.0001) of a degree.

One working example of the head control circuit described above is shown in Fertig et al., "A High-Speed General Purpose Input-Output Mechanism with Real-Time Computing Capability", Computer Design Magazine, April, 1968, Pages 72-78. An improved, more sophisticated head control circuit of the described type is shown in the copending application of the inventor herein, Ser. No. 558,348, filed Mar. 14, 1975 and assigned to the assignee hereof, said copending application discussing both the Fertig et al. apparatus and the improved control circuit in greater detail, which discussions are incorporated herein by reference.

A second electronic servo loop, including a conventional laser interferometer 32, is operatively connected to motor 18 and carriage 14 for monitoring and controlling the linear motion of the carriage and the cutting head 12. A mirror unit 34, which may include two or more suitable folding mirrors, is carried by carriage 14 and is positioned to receive a light beam from interferometer 32, and to reflect the same back to the interferometer, the received and reflected beams being depicted in phantom at 36,36'. A laser read-out 38 is connected to interferometer 32 and provides a digital output as a function of the linear displacement of carriage 14 from its reference or zero position. For added precision, a compensation circuit 40 responsive to the ambient conditions is connected to laser read-out 38 to compensate for any changes in the velocity of beams 36,36' induced by changes in the ambient barometric pressure, temperature or humidity. One example of an integral interferometer 32, read-out 38 and compensator 40 with which the present invention has been successfully used is a model 5525A Laser Interferometer marketed by Hewlett-Packard Company of Palo Alto, California, this model being discussed in detail in the Hewlett-Packard Journal, Volume 21, Number 12, Aug., 1970. This particular interferometer has an accuracy of 0.00001 inch, and, hence, may be used to divide one inch of carriage motion into one hundred thousand increments.

A fixed frequency feed oscillator 42 is connected through a first frequency divider 44 to the incrementing input 46 of head control circuit 28. Oscillator 42 is also connected to a pitch select circuit 48 which preferably comprises a programmable frequency divider. The output of pitch select circuit 48 is connected through a second frequency divider 50 to the input 51 of a counter 52. A digital comparator 54 receives a first input from laser read-out 38 and a second input from counter 52, and provides an output as a function of the difference therebetween to a digital-to-analog converter 56. The output of converter 56 is fed through a servo amplifier 58 to carriage motor 18.

In operation, lead screw generation is accomplished by providing pulses at head control input 46 and counter input 51 at exactly the correct frequency ratio selected by preset frequency dividers 44,50 and by variable or programmable pitch selector 48. For example, in the preferred embodiment of head control circuit 28 described above, 3.6 million pulses at input 46 will cause headstock 22 to rotate workpiece 26 exactly one revolution. Similarly, ten thousand pulses per second will cause the headstock to rotate workpiece 26 at a rate of one degree per second. For the preferred embodiment of interferometer 32,38 described above, one hundred thousand pulses at counter input 51 causes carriage 14 to translate exactly one inch. Therefore, if 3.6 million pulses are supplied at input 46 during the same time period as one hundred thousand pulses are supplied to counter input 51, carriage 14 and cutting head 17 will be stepped a total distance of one inch per one revolution of headstock 22 and workpiece 26, and the resulting lead screw will have a pitch of one thread per inch.

It is presently preferred to pre-program frequency dividers 44,50 during assembly thereof to divider the frequency of the oscillator 42 by a factor of one hundred. The pitch or lead of the final lead screw will then depend upon the setting of pitch selector 48 which, as indicated above, is preferably made operator programmable. The advantage of providing preset dividers 44,50 lies in the fact that the desired pitch may now be selected by entering into selector 48 a multiple of the preset division factors, which multiple is equal to the desired number of threads per inch. Thus, if selector 48 is set to divide by four hundred (i.e., four times one hundred), then the generator screw will have a pitch of four threads per inch. Conversely, if the pitch selector is set to 25, then the pitch of the completed lead screw will be 0.25 threads per inch, or, stated differently, a lead of four inches per thread. Thus, provision of dividers 44,50 allows selection of a desired pitch to two decimal accuracy. Where three decimal accuracy is desired, dividers 44,50 may be preset to one thousand, etc.

More generally, where the servo loop connected to headstock 22 divides one revolution of workpiece 26 into N increments or steps and the servo loop connected to carriage 14 divides a selected interval of linear displacement, specifically one inch, into M discrete intervals or steps, where frequency divider 44 provides at input 46 a loop-stepping signal having a frequency R and dividers 44,50 provide at input 51 a loop-stepping signal having a frequency L, the generated lead screw will have a pitch of RM/LN threads per inch. Thus, the ratio of rotary to linear motion is RM/LN revolutions per inch. The overall rate of motion of generator 10 is easily varied by controlling the frequency of feed oscillator 42. For example, a 30 MHz output from feed oscillator 42 will produce a 300 KHz signal at input 46 (30 million divided by 100), and, therefore, produce a rotation of headstock 22 and workpiece 26 equal to 30° per second or five R.P.M.

Lead screw inspection may be readily accomplished by replacing cutting head 12 with a suitable follower probe, such as a linear voltage-differential transformer position sensing probe of the type disclosed in the copending application of the inventor herein, Ser. No. 559,689 filed Mar. 19, 1975. The probe may be positioned with respect to the completed workpiece to follow the thread groove under test. Linear motion of carriage 14 and rotary motion of headstock 28 are again controlled by the system provided by the invention, whereby the probe senses deviation in the thread under test from the desired thread determined by controlled carriage and piece motion. A conventional strip chart recorder may be connected to the sensing probe with the chart motor being operated, for example, by the output of converter 56 to thus drive the chart in synchronism with carriage 14. The probe output may be connected to the chart pen drive electronics to provide an indication, by the excursion of the resulting trace from a desired base line, of both the extent and location of irregularities in the tested lead screw.

In some applications of the control circuit provided by the present invention in combination with a lead screw generator, it may be contemplated that the lead screws to be generated will usually be "coarse", i.e., have but a fractional number of threads per inch, and specified by lead or inches per thread. The modification shown in FIG. 2 may be used in such an application for programming the lead of the screw to be generated, rather than the pitch thereof, thereby eliminating a calculation step in which an error may be made and a workpiece wasted. In the modification shown in FIG. 2, wherein reference numerals identical to those used in FIG. 1 indicate identical blocks or parts, the pitch selector 48 of FIG. 1 is removed and the output of feed oscillator 42 is connected directly to frequency divider 50. An operator programmable lead selector 60 is connected between the output of feed oscillator 42 and frequency divider 44. Thus, lead selector 60 may be set at a multiple of the preset division factor of dividers 44,52, which multiple is equal to the desired number of inches per thread. In the example wherein dividers 44,52 are set at one hundred, lead selector 60 may be set at 400 (i.e., four times 100 ) to generate a lead screw having a lead of four inches per thread.

A second modification of the basic control circuit shown in FIG. 1 is depicted in FIG. 3, wherein, again, reference numerals identical to those used in FIGS. 1 and 2 indicate identical components or blocks. In the modification of FIG. 3, frequency divider 50 has one output connected to a common contact 62 of a double pole, double throw toggle switch which is generally indicated at 63 and has the respective contact sets 64,65. A second output of divider 50 is connected to an operator programmable frequency divider 66 which has its output connected to the common contact 68 of contact set 65. The normally closed and normally open contacts 70,74 of contact set 64 are respectively connected to the up-counting and down-counting inputs of an up/down counter 72. The normally closed and normally open contacts 76,78 of contact set 65 are respectively connected to the common contacts 80,81 of a double pole switch which is generally indicated at 82 and has the respective contact sets 83,84. Switch 82 may be a three position, double pole rotary switch or, preferably, may comprise a double pole, double throw "center off" toggle switch. A first normally open contact 85 of set 83 and the opposite normally open contact 86 of set 84 are connected together at the down-counting input of counter 72. Similarly, the second normally open contact 88 of set 83 and the opposite contact 90 of set 84 are connected together at the up-counting input of counter 72.

In the operation of the modification shown in FIG. 3, lead screw generator 10 may be selectively controlled to generate either right-hand or left-hand lead screws without changing the direction of rotation of headstock 22 by merely placing switch 63 in the upper or lower (normally closed or normally open) positions respectively. Thus, in the "right-hand" position of switch 63, the output of frequency divider 50 is connected via contacts set 64 to the up-counting input of counter 72, such that counter 72 operates in a manner analogous to counter 52 of FIG. 1, causing carriage 14 to traverse base 16 in a particular direction and thereby generating a right-hand lead screw. Conversely, positioning of switch 63 in the "left-hand" position causes counter 72 to count downwardly, and thus causes carriage 14 to traverse in the opposite direction. It will be recognized, of course, that association of the up-counting input with a right-hand lead screw and the down-counting input with a left-hand screw are arbitrary and depend, for example, on the selected direction of rotation of headstock 22, and the direction selected for traverse of carrier 14 relative to the direction of rotation of the headstock in either the right-handed or left-handed operation.

The modification shown in FIG. 3 may also be used to slightly expand or contract the pitch (or lead) of the generated screw as compared with the specified pitch of the lead screw in operation. As indicated above, this option is convenient where the lead screw is to be used at a temperature substantially different from that at which it was generated. To expand the screw lead, i.e., to make the generated lead slightly larger than the desired operating lead, and to thereby compensate for a known shrinkage of the lead screw at operating conditions, switch 82 is placed in the lower position as viewed in FIG. 3. Thus, the output of frequency divider 66 is effectively added to the output of divider 50 at either the up-counting or down-counting input of counter 72, depending upon the position of switch 63. Conversely, to contract the lead of the generated screw and thereby compensate for a known expansion of the screw at operating conditions, switch 82 is placed in the uppermost position, whereby the output of divider 66 is fed to the opposite input of counter 72 as compared to the output of divider 50, and is thus effectively subtracted from that output. Of course, the center position of switch 82 is the off position wherein the expansion/-contraction option is not used.

To illustrate the operation of the expansion/contraction option, where it is known that the generated lead screw will contract lengthwise 0.001 inch per inch during operation, it would be desirable to generate a lead screw having a selected number of threads per 1.001 inches at ambient temperature, i.e., having an expanded lead. To accomplish this, where frequency divider 50 is preset at 100 as explained above, divider 66 is programmed to divide by one thousand, and switch 84 is placed in the lower or expand position. Thus, for each one hundred thousand pulses at the up-counting input to counter 72 from divider 50, an extra 100 pulses will be provided at the same input by divider 66. These extra one hundred pulses expand the lead of the generated lead screw by the desired 0.001 inch per inch.

From the foregoing description it will now be apparent that the machine position control system provided in accordance with the present invention and described hereinabove fully satisfies all of the objects, aims and advantages set forth. Although the invention has been described in conjunction with several specific embodiments thereof, it will be evident that many alternatives, modifications and variations will suggest themselves to persons skilled in the art in view of the foregoing description. For example, it will be apparent with reference to FIGS. 1 and 2 that, where selectors 48,68 are such that they may be programmed in decimal fractions to the desired pitch or lead accuracy, or where the pitch or lead will always be an integral number of threads per inch or inches per thread, frequency dividers 44,50 may be eliminated and the frequency of feed oscillator 42 may be reduced accordingly. Furthermore, although the invention has been described in combination with a phase-locked servo system connected to headstock 28 (FIG. 1) and an interferometric servo system connected to carriage 14, which combination yields the highly accurate results described, it will be evident that the control concepts and embodiments disclosed will be equally useful, with little or no modification, to other types of motion indexing apparatus, such as digital encoders, etc. Moreover, it will be apparent that, although the invention has been disclosed in conjunction with a lead screw generator, the concepts embodied in the disclosed control system will be equally useful and applicable in other machine control applications wherein it is desired to control the rate of displacement of two elements of a machine at a preselected, fixed ratio. Accordingly, the invention is intended to embrace these and all other such alternatives, modifications and variations that fall within the spirit and broad scope of the appended claims.

The invention claimed is:

1. In combination with a machine for cutting a helical lead of uniform pitch and contour on a rotary member and including means adapted to support and rotate a workpiece, a carriage, and a cutting head mounted on said carriage for linear motion with respect to said workpiece, a circuit to control the rate of rotary displacement of said workpiece and the rate of linear displacement of said carriage and cutting head at a preselected uniform ratio with respect to one another comprising a first incremental servo loop operatively connected to said rotating means to divide each revolution of said workpiece into a preselected number of increments N and responsive to a first indexing signal to index said workpiece as a function of said rotational increments, a second incremental servo loop operatively connected to said carriage to divide a selected interval of linear motion of said carriage into a preselected number of increments M and responsive to a second indexing signal to index said carriage as a function of said linear increments, a fixed frequency oscillator, means connecting said oscillator to said first servo loop to provide said first indexing signal at a frequency R, and means connecting said oscillator to said second servo to provide said second indexing signal at a frequency L, said second indexing signal being timed uniformly with respect to said first indexing signal, the pitch of said helical lead and said ratio being equal to RM/LN threads per selected length interval.

2. The combination set forth in claim 1 wherein said means connecting said oscillator to said second servo loop comprises a frequency divider machine-operator programmable in units of threads per inch.

3. The combination set forth in claim 1 wherein said means connecting said oscillator to said first servo loop comprises a frequency divider machine-operator programmable in units of inches per thread.

4. The combination set forth in claim 1 wherein said means connecting said oscillator to said second servo loop comprises a first frequency divider having an input connected to said oscillator, an up/down counter having an up-counting and a down-counting input, a second frequency divider having an input connected to an output of said first frequency divider, first switch means selectively connecting the output of said first frequency divider to either said up-counting or said down-counting input, and second switch means selectively connecting the output of said second frequency divider to either said up-counting or said down-counting input.

5. A circuit for controlling the rate of displacement of two independently motor-driven components of a machine at a preselected ratio comprising first means controlling the rate of displacement of one of said components in one direction and dividing an interval of displacement of said one of said components into a first selected number of equal increments, second means controlling the rate of displacement of the other of said components in another direction and dividing an interval of displacement of said other of said components into a second selected number of equal increments, an oscillator providing a signal at preselected frequency, means connecting said oscillator to said first means such that said one of said components is indexed in said one direction, first and second frequency dividers having respective inputs operatively connected to said oscillator and respective outputs to provide first and second frequency-divided signals, a counter connected to receive said first and second frequency-divided signals, and means connecting said counter to said second means such that said other component is indexed in said other direction at a ratio when compared to displacement in said one direction which is a function of both said first and said second frequency-divided signals.

6. The circuit set forth in claim 5 wherein said input to said second frequency divider is connected to said output of said first frequency divider.

7. The circuit set forth in claim 5 wherein said other component is indexed at a rate which is proportional to the sum of or the difference between said first and second frequency-divided signals.

8. The circuit set forth in claim 5 wherein said counter is an up/down counter having an up-counting and a down-counting input, said output of said first frequency divider being operatively connected to one of said up-counting and said down-counting inputs, said circuit further comprising switch means selectively connecting the output of said second frequency divider to either said up-counting or said down-counting input.

9. The circuit set forth in claim 5 for use in controlling rotary and linear displacement of a lead screw generator wherein one of said machine-driven components includes means adapted to support and rotate a workpiece and another of said machine-driven components includes carriage means adapted to support a cutting head for linear motion with respect to said workpiece, said first and second means being selectively connected to control either said linear displacement of said carriage means or said rotary displacement of said workpiece support means respectively.

* * * * *